United States Patent [19]

Svedlund et al.

[11] Patent Number: 5,039,028
[45] Date of Patent: Aug. 13, 1991

[54] OVERLOAD PROTECTION

[75] Inventors: Tommy Svedlund, Lerum; Björn Olvepud, Borlänge, both of Sweden

[73] Assignee: Akerstroms Bjorbo AB, Sweden

[21] Appl. No.: 358,367

[22] PCT Filed: Sep. 25, 1987

[86] PCT No.: PCT/SE87/00433
§ 371 Date: May 22, 1989
§ 102(e) Date: May 22, 1989

[87] PCT Pub. No.: WO88/02478
PCT Pub. Date: Apr. 7, 1988

[30] Foreign Application Priority Data

Sep. 26, 1986 [SE] Sweden ................................ 8604084

[51] Int. Cl.⁵ ............................................. B66D 1/58
[52] U.S. Cl. .................................................. 242/275
[58] Field of Search ................. 254/275, 362; 318/430, 318/431, 434, 452–455, 461–464, 466, 468, 469, 474, 476

[56] References Cited

U.S. PATENT DOCUMENTS 3,019,640  2/1962  Engelmann .
4,434,971  3/1984  Cordrey ........................ 254/275 X
4,490,656  12/1984  Arnold .

FOREIGN PATENT DOCUMENTS 1288271  1/1969  Fed. Rep. of Germany ...... 254/275
1237757  6/1971  United Kingdom .
2164811A  3/1986  United Kingdom .

Primary Examiner—Katherine Matecki
Attorney, Agent, or Firm—Nixon & Vanderhye

[57] ABSTRACT

Method and device for indicating overload are provided for a load suspended from a hoist. The hoist comprises a slip-ring induction motor (1). The input power together with the angular acceleration of the motor are metered. Then the metered values are compiled in a computer (5) by means of a suggested formula in order to estimate the hook load. The lift will be stopped, if the hook load continuously exceeds a predetermined value during a predetermined time.

8 Claims, 7 Drawing Sheets

OVERLOAD PROTECTION

OBJECT OF THE INVENTION

The present invention relates to a method of and a device for indicating overload and interrupting the lifting of an overload when a hoist is used that is driven by an asynchronous induction motor.

BACKGROUND OF THE INVENTION

Within a wide field of activities, cranes and other hoists are being used to lift and move different work loads. The work loads are hooked on to a lifting hook or similar device. Via one or more wire ropes, the hook will then be connected to a winding drum, driven by an induction motor. Between the winding drum and the induction motor may be gear mechanisms in order to adapt suitable motor revolutions per minute to convenient lifting speed. The load will be lifted when the wire is wound on the winding drum and vice versa. The induction motor may advantageously be provided with slip rings connected to fixed or variable resistances. The purpose of this is to get a smooth starting of the lifting and to limit the starting currents of the motor. The hoist is dimensioned for the rated work load. In order not to exceed this load, the lifting should be switched off by to the hoist motor when the rated load is exceeded. Regulations about switches are available for example in statute-book AFS 1980:19 of the Swedish Board of Occupational Safety and Health. From § 13 is quoted: "A switch may be designed so as to time-delay or damp its switching-off function automatically when instantaneous excessive load occurs at the start. Normally, a time delay or damping must not last longer than 0.5 seconds."

This implies that the switch has to switch off the hoisting movement during a period when the system is still being exposed to acceleration forces, and before the start resistances have been uncoupled.

It is known in the art to estimate the work load at a speed of 0 or at a constant speed of movement upwards or downwards. For instance, this may be done by metering the tension in the wire ropes or the compressive forces of shafts and bearing supports.

It is also possible to estimate the work load weight by measuring the input power of the hoist motor, the electric current in the rotor winding, the current frequencies in the rotor winding, and so on. This is clear from the Russian patent publication No. 705270 and the Japanese patent publications No. 56-53420 and 56-58623. On the other hand, no simple method is known that is suitable continuously to estimate the weight of the load during starting up, during the acceleration and when the rotor resistances are switched on or off. No such method provides the hoist with an overload protection device that interrupts the hoisting at a very early stage, for example within half a second, so that no security risk will appear due to overload. The main difficulties arise on the one hand from the fact that energy is needed during acceleration for imparting kinetic energy to rotating parts and to the work load, the hook and other movable masses and on the other hand from the need of connecting and disconnecting various resistances in the rotor circuit.

Surprisingly, it has turned out that it is possible to estimate the weight of the load with great accuracy and reliability during the acceleration period at the start of a hoisting operation if the angular acceleration of the hoist motor rotor or some other rotary movement in the system is measured together with the input power of the motor and processed in a convenient computer unit.

BRIEF DESCRIPTION OF THE DRAWINGS

FIG. 5 is a diagram for power verses time during hoisting of a work load of 10κ tons;

DETAILED DESCRIPTION OF THE INVENTION

Figure 1:
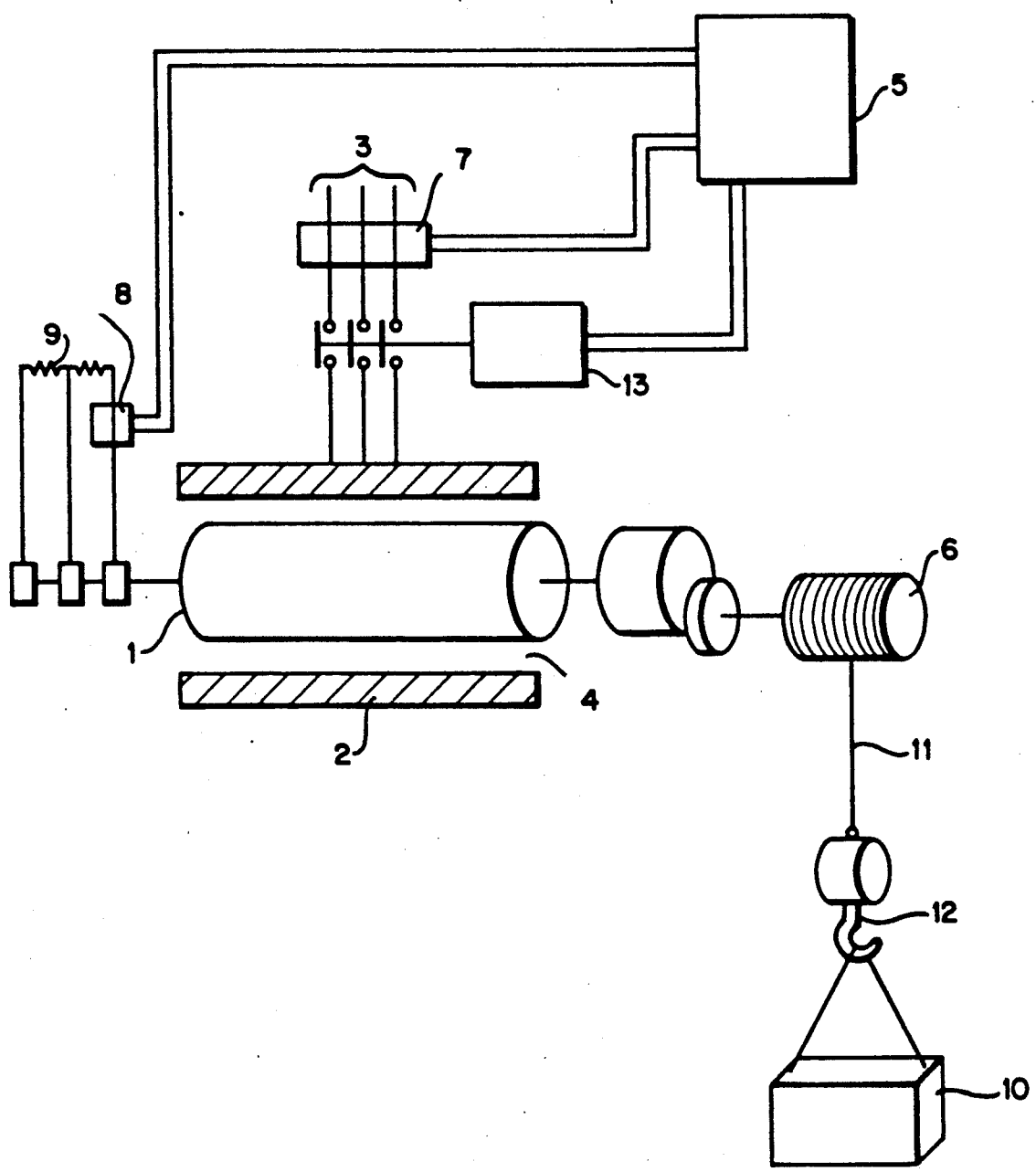
FIG. 1 is a diagrammatic view of the hoist and associated controls in accordance with an exemplary embodiment of the invention.

In order to make the invention clear, we have tried theoretically to account for the formula which is fundamental to the invention. The enclosed figure is very schematic, and shows a hoisting device that is an example of an embodiment of the invention.

The hoisting apparatus comprises a slip-ring induction motor 1 with its stator winding 2 connected to a feeder cable 3 via a switch 13 and a power meter 7. The rotor gap of the induction motor is denoted by numeral 4. An instrument transformer 8 is connected for measuring the rotor frequency. The power meter 7, the instrument transformer 8 and the switch 13 are connected to a computer 5. The hoist is provided with a winding drum 6, a lifting wire or rope 11 and a lifting hook 12 in which a load 10 is suspended.

The input power $P_1$ of the induction motor 1 is transmitted to the stator winding 2 via the feeder cable 3. The power may be divided up into two parts, namely $P_2$ and $P_{2-4}$. $P_2$ indicates the copper losses appearing in the stator winding 2 and may be considered to be constant within the actual working range. $P_{2-4}$ indicates the power transmitted between stator 2 and rotor 4.

Accordingly, $P_1 = P_2 + P_{2-4}$  (1)

Further the following applies:
$$P_{2-4} = \omega_s T_m \quad (2)$$

where:

$\omega_s$ is the synchronous revolutions per minute (rpm) of the induction motor 1.

$T_m$ is the torque of the motor 1.

Further, the well-known equation of inertia applies:

$$J \cdot \omega = T_m - T_L \quad (3)$$

where:
J = the moment of inertia of the system.
ω = the angular acceleration
$T_L$ = the load torque experienced by the driving motor.
Equations (1) and (2) have been taken from the book "Elektriska maskiner" by Karl Erik Hallenius, 2nd Edition, Malmö, Liber läromedel 1977, PP 10:38-10:81.

Equation (3) has been taken from the book "TEFYMA; Handbok för grundläggande teknisk fysik, fysik och matematik" by Ingelstam-Rönngren-Sjöberg, Sjöbergs f/ rlag, Stockholm/Bromma 1984, p 69.

The revolutions per minute, ω, may be established anywhere within the system by means of a suitable measuring device. Accordingly, to the figure, an instrument transformer 8 is used that measures the revolutions per minute by measuring the rotor circuit frequency which is proportional to the speed of rotation. In computer 5, the frequency amount will be converted into an amount of speed of rotation ω.

Equations (1) to (3) result in:

$$J \cdot \omega = \frac{P_{2-4}}{\omega_s} - T_L \quad (4)$$

$$T_L = \frac{P_1 - P_2}{\omega_s} - J \cdot \omega \quad (5)$$

As $$\frac{1}{\omega_s}, \text{ and } \frac{P_2}{\omega_s}$$

and J are constant in this case, the formulae may be simplified as follows:
$$T_L = K P_1 - A - B \cdot \omega \quad (6)$$

where K, A, and B are constants.
The equation for this load case is as follows:
$$T_L = (M_x + M_o)(a+g) \cdot r \quad (7)$$

where $M_x$ = weight of work load 10
$M_o$ = the weight of other parts suspended from the winding drum 6, such as wire 11, hook 12 etc;
g = the acceleration due to gravity
a = the instantaneous acceleration of the work load, and
r = the imaginary radius experienced by the motor.

The force $F_x$ exerted on the hoisting machinery is $$F_x = M_x (a+g) \quad (8)$$

where $a = r \cdot$ \quad (9)

If the items (7), (8) and (9) are inserted in the equation (5), the result will be:

$$F_x = \frac{K}{r} \cdot P_1 - \left(\frac{A}{r} + M_o \cdot g\right) - \left(\frac{B}{r} - r \cdot M_o\right) \cdot \omega$$

The terms $\frac{K}{r} \cdot \left(\frac{A}{r} + M_o \cdot g\right)$ and $\left(\frac{B}{r} - r \cdot M_o\right)$ are constant during the hoisting.
Insertion of $$\frac{K}{r} = K_1$$

-continued $$\frac{A}{r} + M_o \cdot g = A_1$$

$$\frac{B}{r} - r \cdot M_o = B_1$$

resulting in the following expression.
$$F_x = K_1 \cdot P_1 - A_1 B_1 \omega \quad (10)$$

Now we have to establish constants $K_1$, $A_1$ and $B_1$ as follows:
1. Reading power input $P_3$ without load 10 and when having the following acceleration: ω=0. The value is indicated by $P_a$.
2. Reading power input $P_1$ when knowing load F and having the following acceleration: ω=0. The value is indicated by $P_b$.

From this we get the following system:

$$O = K_1 \cdot P_1 - A_1 - B_1 \cdot O$$

$$F = K_1 \cdot P_b - A_1 - B_1 \cdot O$$

Being a system of equations, from which $A_1$ and $K_1$ may be solved. After having done this, we make a further trial loading with a known load, indicated by 10 in FIG. 1. Then we can read power input as well as angular acceleration when the angular acceleration is not=0. In this way, we can also establish constant $B_1$.

According to the formula $F_x = K_1 \cdot P_1 - A_1 - B_1 \sqrt{\omega}$, (10) the hook loading $F_x$ may be calculated when knowing constants loading $F_x$ consists of the real load 10 plus the dynamic addition of the load, but in this application, the dynamic addition is small as compared with the real load 10.

The formula may also be written as follows:

$$a(F_x - A_1) = P_1 - b \cdot \omega = c \cdot P_1$$

where a, b, and c are constants. This formula may be termed as a subtraction of the angular acceleration of the motor from the power input of the motor, one or both parameters having a scaling factor (b or c).

EXAMPLES

In the actual examples we used an overhead crane with following data:

| Rated load | 15 tons |
|---|---|
| Mains voltage $U_h$ | 500 V |
| Rated output of the motor | 35 kW (constant) |
| Synchronous rpm of the motor | 750 |
| Lifting speed | max 10 m/min |

The rotor was provided with 4 resistances 9 connected in series, which we could uncouple in 5 steps.

As instrument we use a personal computer HP 9816, 5, connected to power meter 7 for input power and meter 8 for measuring the rotor frequency.

The values of constants $K_1$, $A_1$ and $B_1$ was established as described under A−K and the values were fed to the computer.

Under paragraph J, we made two test hoistings with hard loads, load=0 and a load of 10 500 kgs. The load $F_x$ estimated by the computer, turned out to correspond to the actual load. The estimated load $F_x$ comprises the static load plus the dynamic addition from the acceleration; accordingly, it is the actual hook load. The dynamic addition is so small in relation to the static load, that it is not clear from the diagrams.

As is clear from paragraph J, the overhead crane was in working order with the load limiting device operating.

A. At first, with five different work loads we established the power input when the lifting speed had stabilized, i.e. at an acceleration=0.

| Measurement No | Work load weight (tons) | Total power input (kW) |
| --- | --- | --- |
| 1 | 0 | 29.12 |
| 2 | 2.5 | 33.7 |
| 3 | 5.1 | 37.4 |
| 4 | 10.5 | 45.1 |
| 5 | 15.6 | 53.7 |

Load weight $10 = \frac{F_x}{g}$ when a = O.

Figure 2:
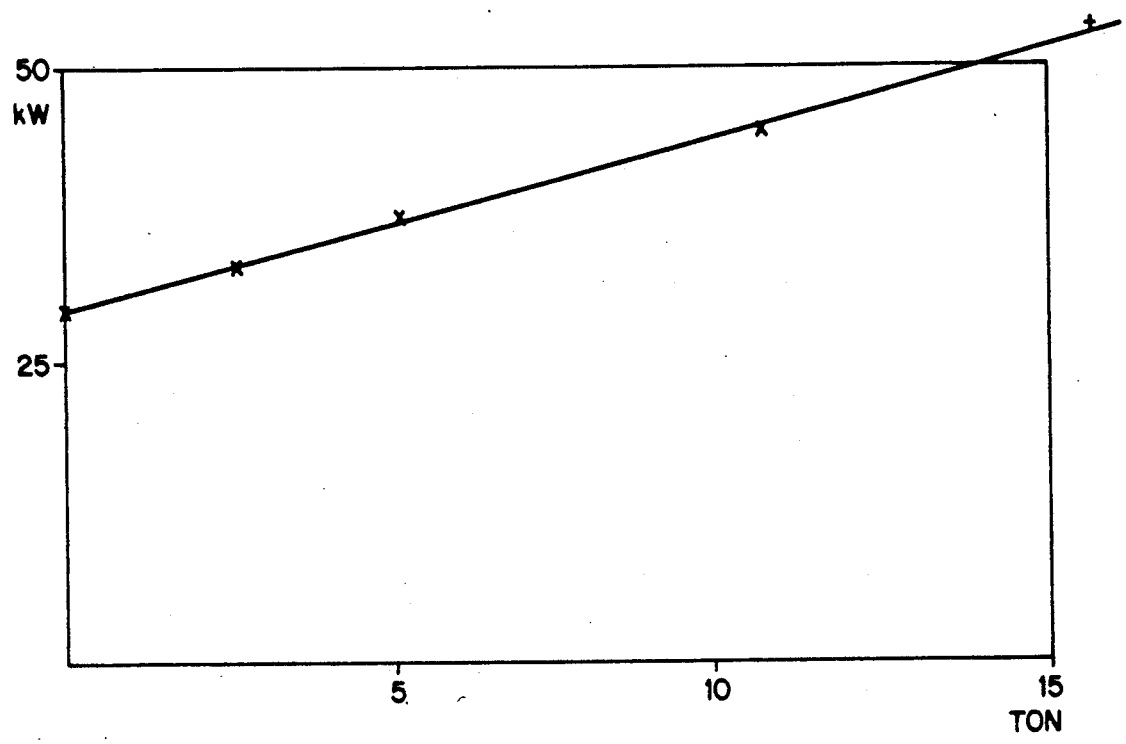
FIG. 2 is a graph showing power as a function of work load in accordance with the invention.

The values were also plotted as shown in FIG. 2 with load 10 along the horizontal axis and the power along the vertical axis. According to the diagram, the power without work load amounted to 29.12 kW, and the power is directly proportional to the load weight 10.

If these values are put into equation 10 above, the constants $K_1$ and $A_1$ will be defined as 6.3 and 183 resp.

Figure 3:
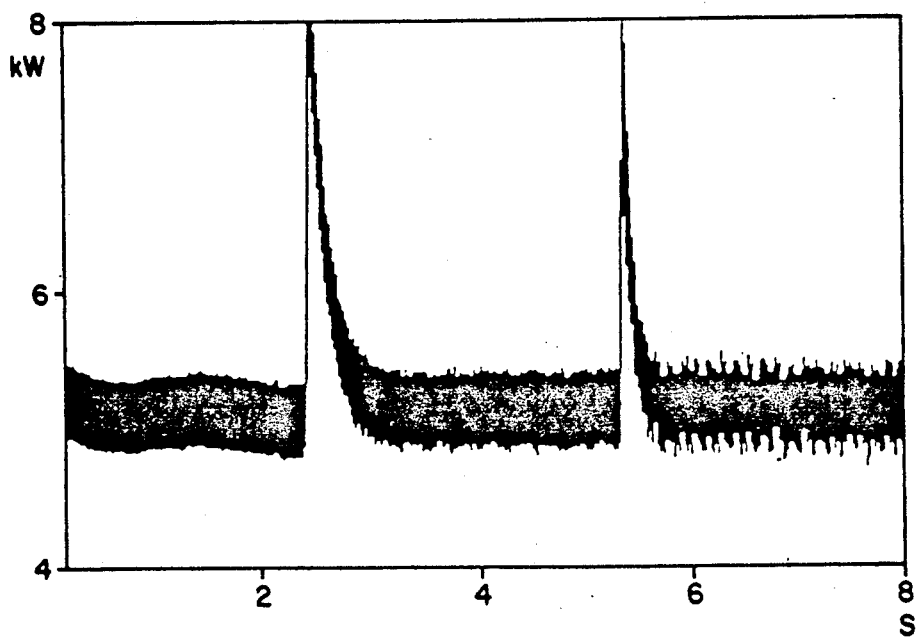
FIGS. 3 through 5 are diagrams showing power versus time under various conditions.

B. At the known work load of 15.6 tons, we measured the power input at 3 different regulating steps with 2, 1 and 0 resistances, 9, respectively, switched into the rotor circuit. The power input (kW) on the vertical and the time (seconds) when measuring, will be clear from FIG. 3. It can be seen that the power input on step 1 amounts to about 54 kW at a constant lifting speed. When switching off one of the resistances 9, step 2, the power input will increase drastically, since the motor, 1, gives a bigger Tm. The system will accelerate up to a new operating point, in which Tm=$T_L$ The power input will adjust to the same power, P, when constant speed again is obtained as will also be the case when the second resistance, 9, is switched off, step 3. Accordingly, the power input is independent of resistance alterations in the rotor circuit at constant lifting speed, but it is increasing during acceleration because of the acceleration forces.

Figure 4:
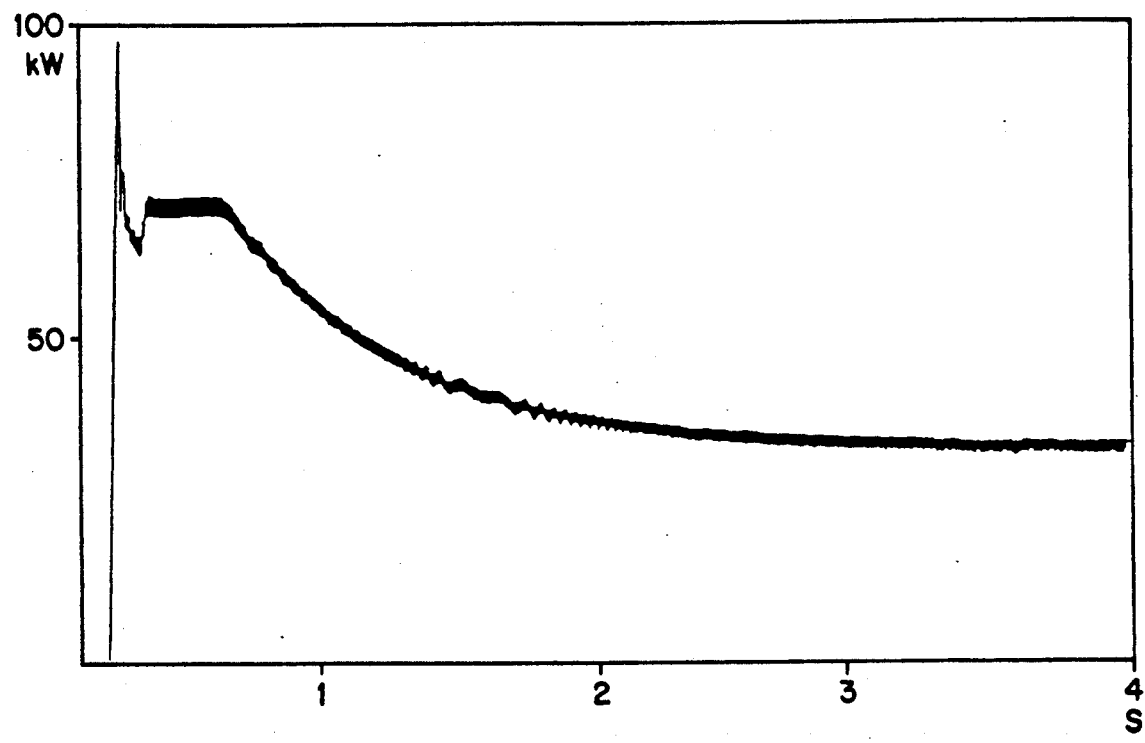

C. The power input of the hoist motor was measured from start-up until having increased the lifting speed to a steady state. The hoist was run without work load. The following facts are clear from FIG. 4, drawn by the computer and showing the power on the vertical and time on the horizontal:

a) a short current peak appeared just when starting.
b) a shorter period with constant power occurred due to the fact that the hoist brake was not yet released.
c) A period of about 4 seconds with falling power followed; then the power stabilized. According to continued testing, the lifting speed was stabilized to constant speed at the same time.

Figure 5:
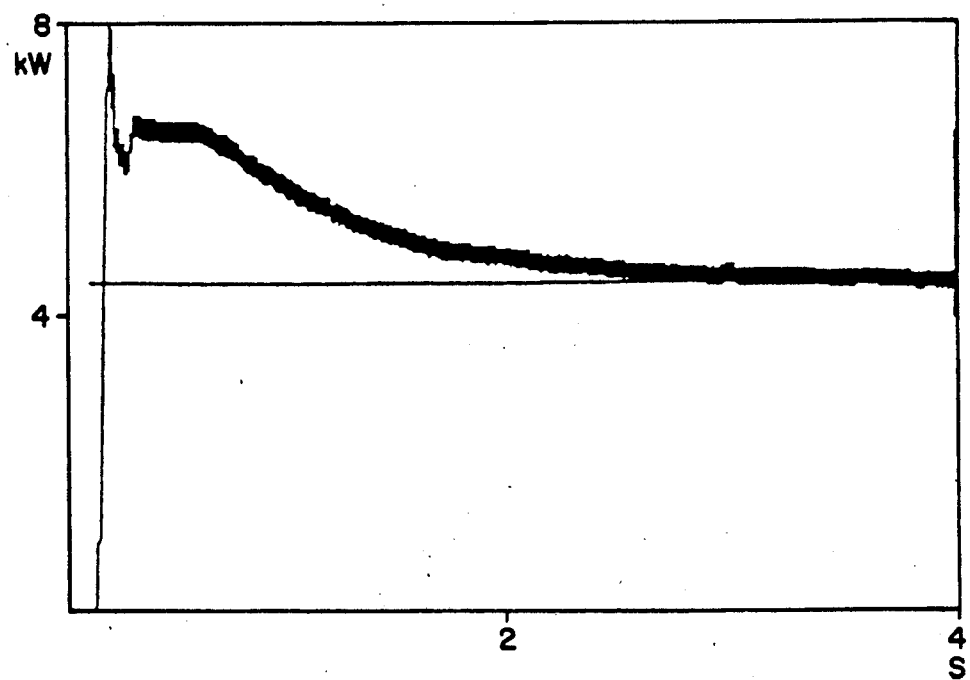

D. FIG. 5 shows a corresponding hoisting of the work load of 10.5 tons.

Figure 6:
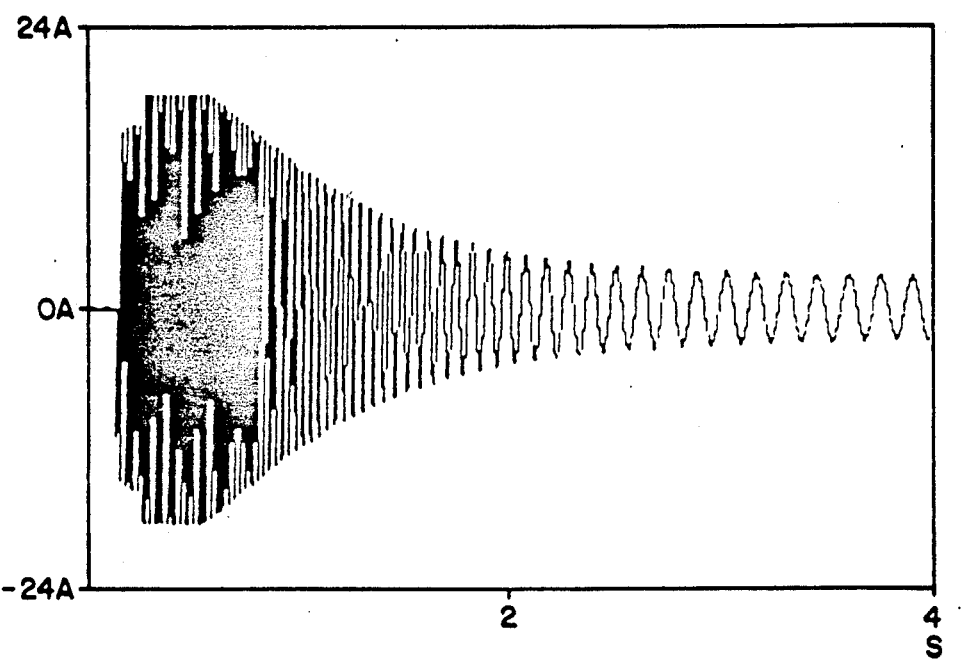
FIG. 6 is a diagram showing rotor current as a function of time from start-up until stabilization.

E. FIG. 6 shows the rotor current as a function of time from start-up until having stabilized at a minimum value. In addition to the fact, that the size of oscillations decreased, the time between two currents peaks increased; accordingly, the slip between the angular velocity of rotor 4 and the synchronous angular velocity of motor 1 decreased. F. Then we could define the slip S by analyzing the variations of the current. The slip S indicated as the synchronous rpm $\omega_s$ minus the actual rpm $\omega$, divided by the synchronous rpm accordingly $$\omega_s = \frac{\omega_s - \omega}{\omega_s}$$

Figure 7:
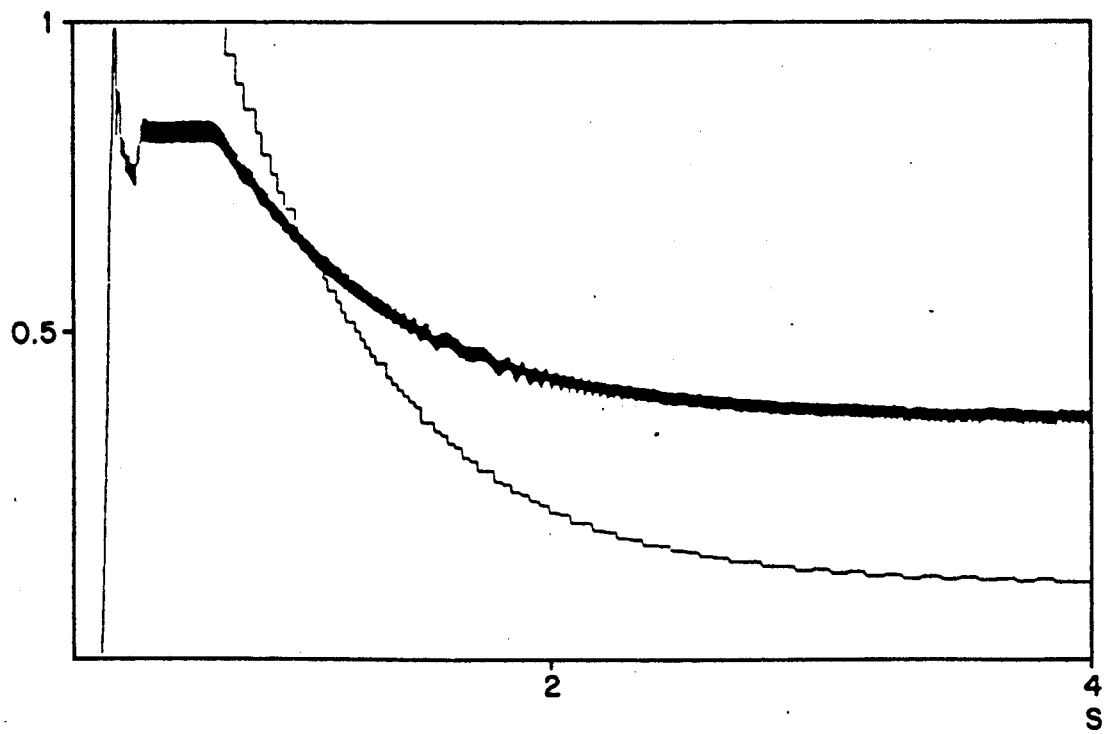
FIG. 7 is a diagram showing power input as a function of time from start-up, and slip at corresponding times.

FIG. 7 shows the power input as a function of time from start-up on the one hand and the slip at corresponding times on the other. It is clear that the angular velocity of the rotor nears a constant value; accordingly, the angular velocity increases asymptotically from zero at start when starting.

Figure 8:
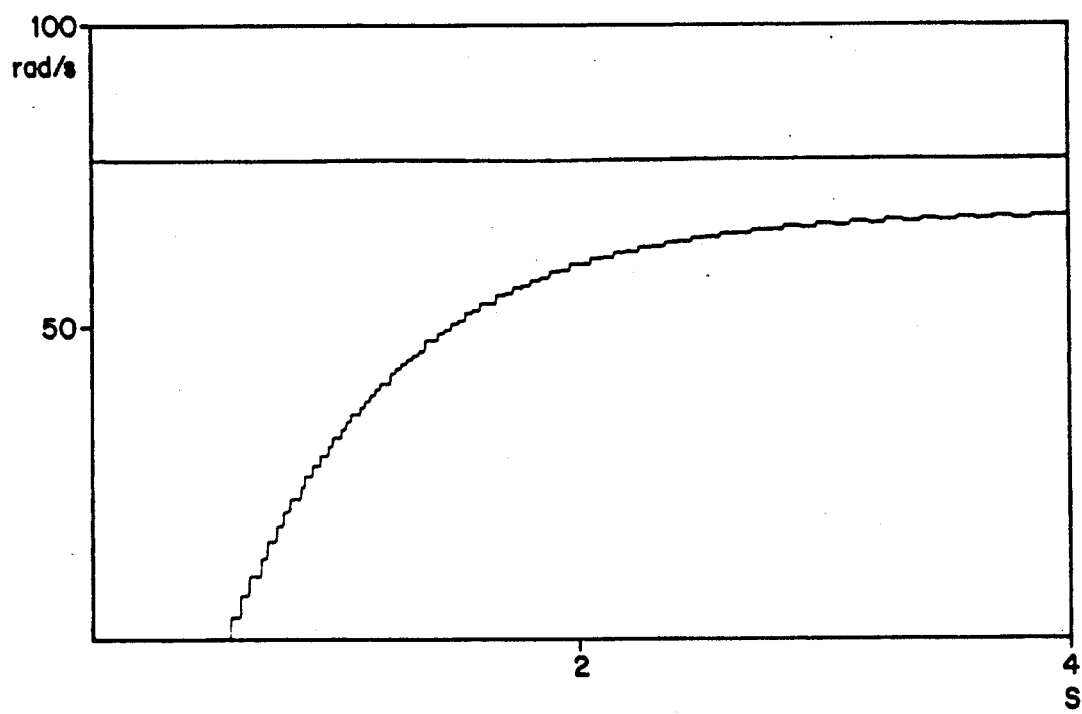
FIG. 8 is a diagram of angular velocity as a function of time.

G. According to the formula stated above, $$\omega_s = \frac{\omega_s - \omega}{\omega_s}$$

the curve according to FIG. 7 was converted into a means to trace the alterations of the angular velocity when starting the hoist. The angular velocity at different times is clear from FIG. 8.

Figure 9:
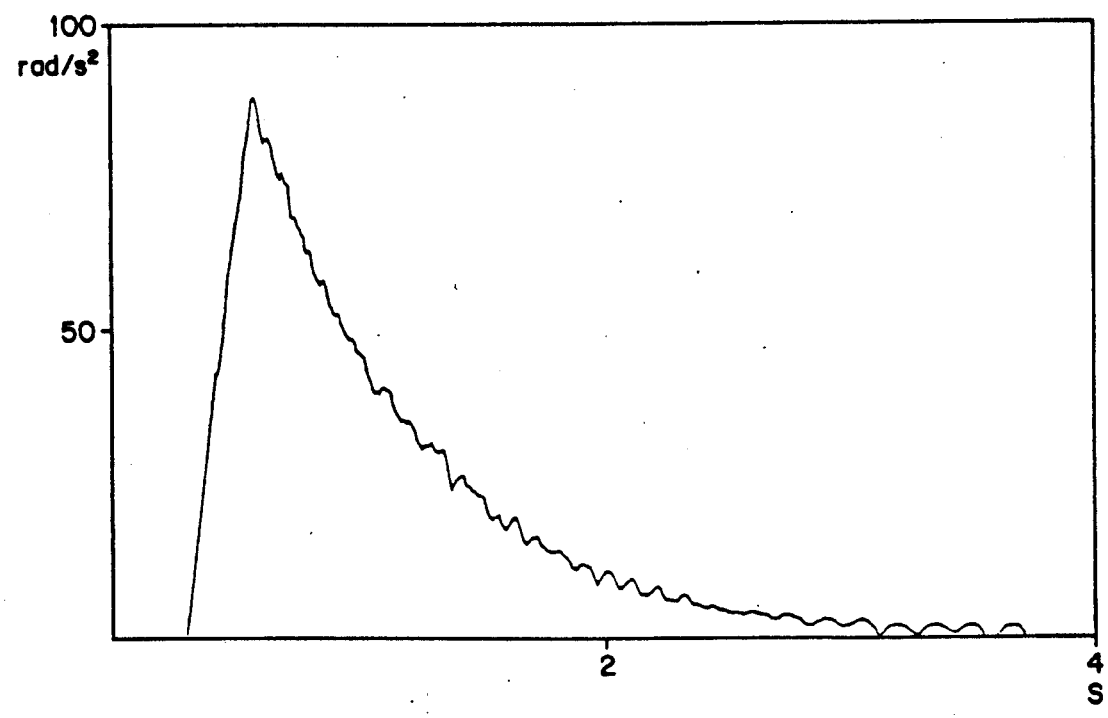
FIG. 9 is a diagram of angular acceleration as a function of time.

H. By having the computer derivate the curve according to Diagram 7, we had the angular acceleration drawn up according to FIG. 9.

I. According to the equation (10) above:

$$F_x = K_1 P_1 - A_1 - B_1 \cdot \omega \text{ or}$$

when $F_x = 0$ (empty hoisting)

$$B_1 = \frac{K_1 \cdot P_1 - A_1}{\omega}$$

Figure 10:
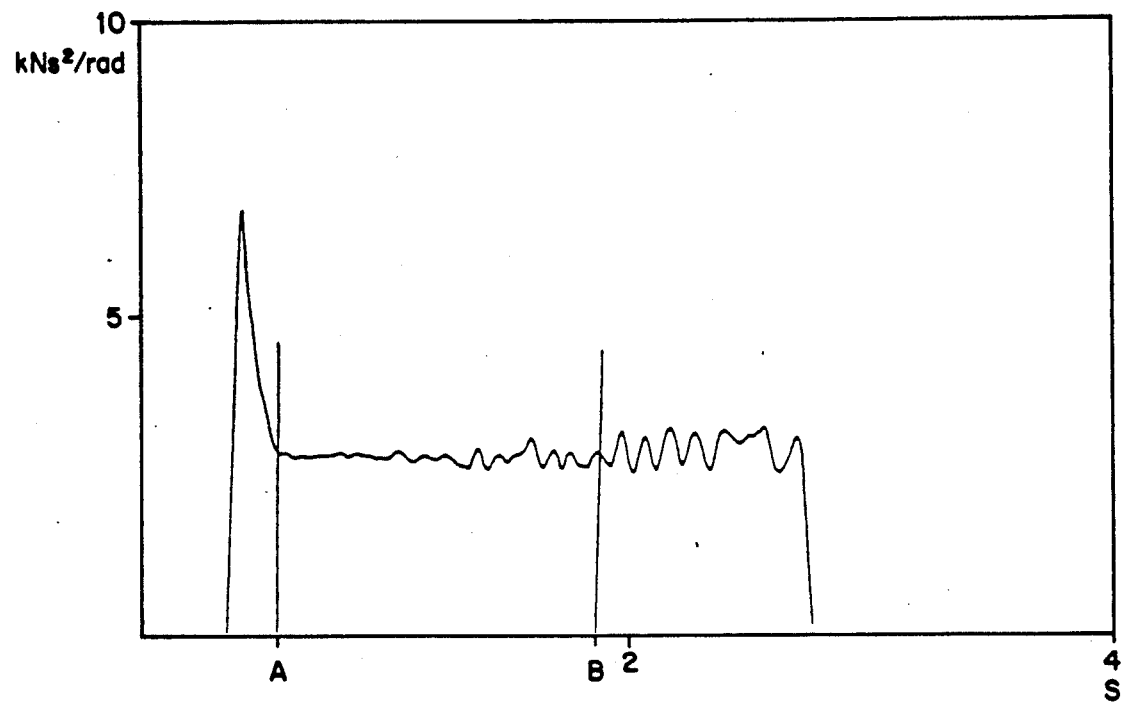
FIG. 10 is a diagram illustrating a value for kNs$^2$/rad as a function of time.

As mentioned above, $K_1$ was established to 6.3 and $A_1$ to 183; now $B_1$ can be established as follows:

$$B_1 = \frac{6.3 \cdot P_1 - 183}{\omega} \quad \text{(FIG. 10)}$$

The interferences at the end are due to the fact, that we are dividing by a small value. When hoisting, the acceleration nears asymptotically zero.

Figure 11:
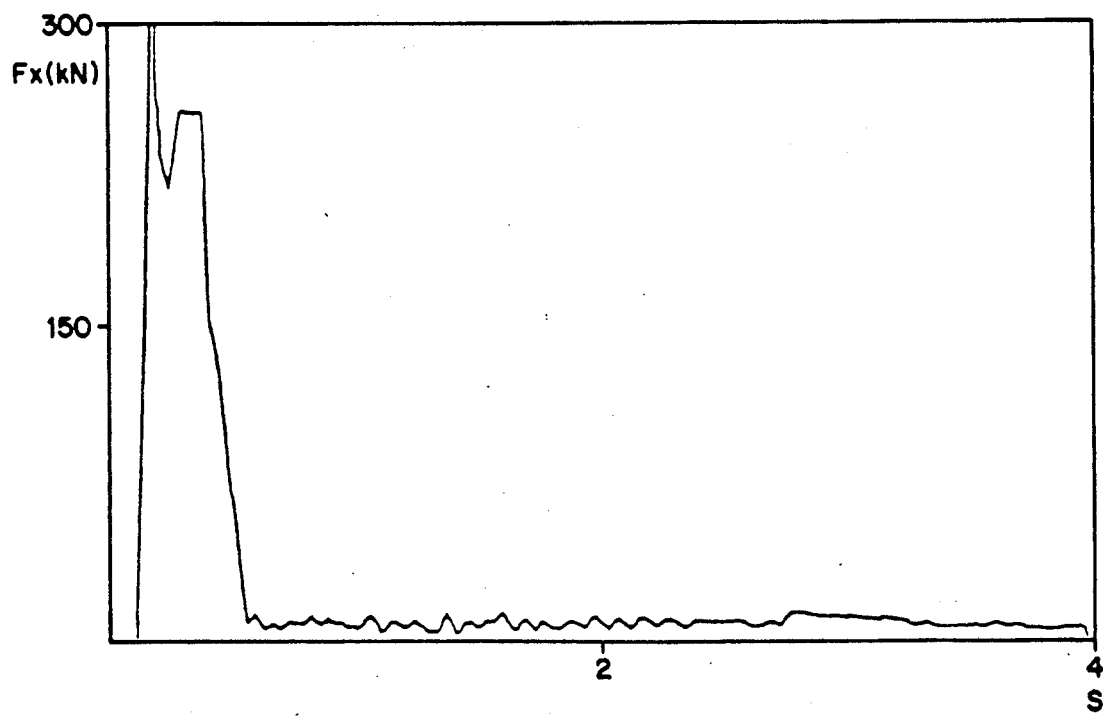
FIG. 11 is a diagram illustrating Fx(kN) as a function of time for empty hoisting.
Figure 12:
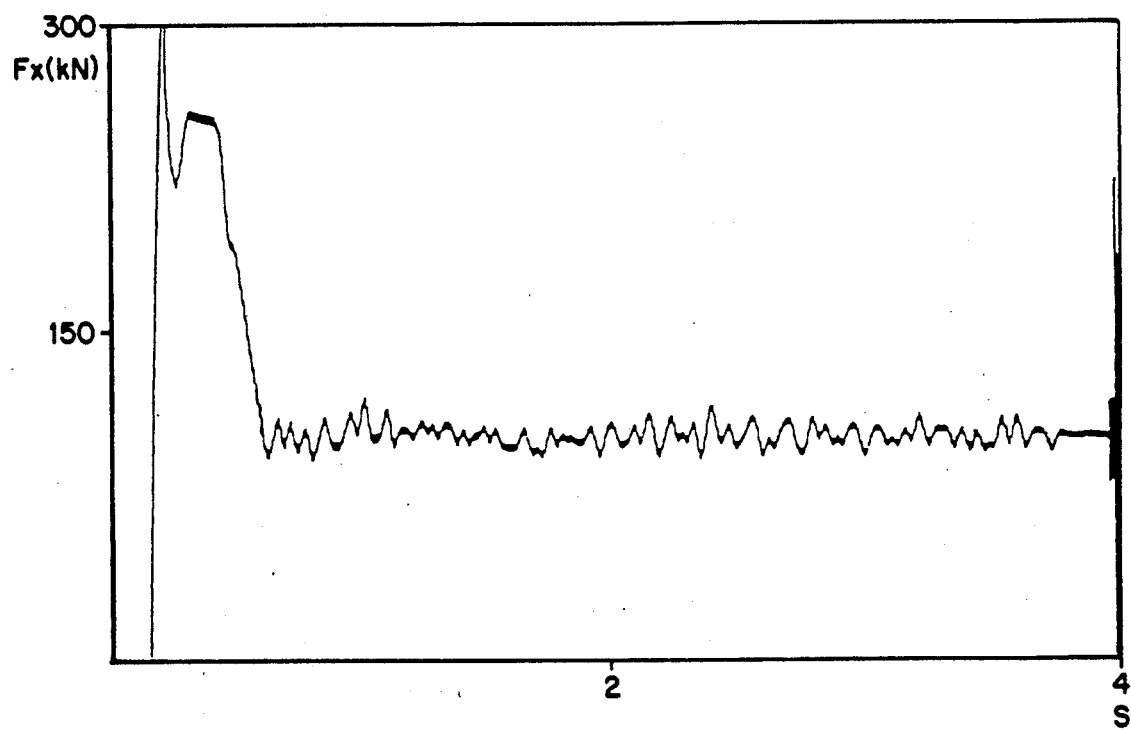
FIG. 12 is a diagram similar to that shown in FIG. 11 but for hoisting a known work load.

J. With the use of the values established for $K_1$, $A_1$ and $B_1$ together with formula (10), curves have been drawn for empty hoisting, FIG. 11, and for a known work load of 10.6 tons, FIG. 12. As is clear from the curves, there are some interferences at the start of the hoisting, for example, due to some mechanical gaps in the system and due to the fact that the break does not release instantaneously, but already after 0.1 to 0.2 seconds, the value of the load weight is obtained. Accordingly, switch 13, connected to the computer, will be triggered already 0.1 to 0.2 seconds after the starting of the hoisting operation if the work load 10 exceeds the permissible value. To facilitate this, the computer could preferably be programmed to provide about 10 estimations a second. Accordingly, according to the invention, an overload protecting device, can be obtained which will stand up to most standards, and which may be adapted to different standards by a simple reprogramming of the computer.

If a standard prescribes that overload may appear, however, only during a predetermined period for example 0.5 seconds, the computer can be programmed to initiate the switching off of the motor's supply current, provided that all calculations during such a period indicate overload. The time concerned is usually 0.2–1.0 seconds, and at least three calculations should be done during the period. Alternatively the computer can be programmed to initiate switching-off when a preset number of calculations have estimated overload, provided that at least this number of calculations are made during the predefined period of time.

We claim:

1. A method of indicating overload and interrupting the lifting of an overload when a hoist is used that is driven by an asynchronous induction motor (1) comprising the steps of first metering the power input of the motor and the angular acceleration of the motor in a test-lifting cycle and calculating the constants $K_1$, $A_1$ and $B_1$ in the following formula:

$$F_x = K_1 \cdot P_1 - A_1 - B_1 \cdot \omega$$

where $F_x$ is estimated hook load, $P_1$ the power input of the motor and $\omega$ is the angular acceleration of the motor, the metering in the test-lifting cycle being carried out with no load and no acceleration, with a known load and no acceleration, and with a known load and known acceleration, and then, in use, metering the input power of the motor and angular acceleration of the motor and using the formula to estimate the hook load, and switching off the motor if the estimated hook load reaches a predefined overload value.

2. A method according to claim 1, including the step of estimating the hook load at least 3 times per second.

3. A method according to claim 2, including estimating the hook load at least 5 times per second.

4. A method according to claim 1 wherein the motor is not switched off until overload has been indicated in a preset number of estimations.

5. A method according to claim 4, wherein the motor is not switched off until all estimations within a predefined period have indicated overload.

6. A method according to claim 5, wherein said predefined period is between 0.2 to 1.0 seconds long.

7. A method according to claim 1 including the step of estimating the hook load several times per second.

8. A protection device for a hoisting apparatus with an asynchronous induction motor (1), the device comprising means for indicating overload and for switching off a supply current to the motor when overload occurs; a power meter (7) connected to an input line (3) of the motor (1); a speed meter (8) for metering the rotational velocity of the motor; a computer (5) connected to the power meter (7) and to the speed meter (8), and arranged to make calculations on a formula several times a second, said formula comprising a subtraction of the angular acceleration from input power with programmed scaling factors, and wherein the computer (5) is programmed to initiate a supply current switch off if a predefined value of the calculation is reached.

* * * * *